United States Patent Office
3,109,008
Patented Oct. 29, 1963

3,109,008
PROCESS FOR THE PREPARATION OF 16-KETO-
18-NOR-STEROIDS
Gaston Amiard, Noisy-le-Sec, and Bernard Goffinet and
Léon Velluz, Paris, France, assignors, by mesne assignments, to Roussel-UCLAF, S.A., Paris, France, a corporation of France
No Drawing. Filed July 8, 1959, Ser. No. 825,657
Claims priority, application France July 25, 1958
6 Claims. (Cl. 260—397.3)

This invention relates to 16-keto-18-nor-13ξ-androstanes substituted in the 3-position, to the process of preparing such compounds and to the intermediate products of the process.

An object of the present invention is to produce 16-keto-18-nor-steroids, and, more particularly, 16-keto-18-nor-13ξ-androstanes substituted in the 3-position, having the geenral structural Formula IX

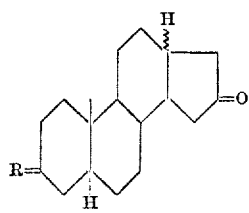

wherein

or =O, and their derivatives such as their esters, ketals or semicarbazones.

A further object of this invention is to develop a process for the production of 16-keto-18-nor-13ξ-androstanes of the general structural Formula IX.

A still further object of this invention is to produce intermediate 3-substituted-18-nor-D-homo-androstane-17-ones, 3 - substituted - 16 - hydroxy - 16,17 - seco - 18 - nor-D-homo-13ξ-androstane-17-oic acids and their lactones and 3-substituted-16,17-seco-18-nor-D-homo-13ξ-androstane-16,17-dioic acids and their lower alkyl esters.

These and other objects of the invention will become apparent as the description proceeds.

The 16-keto-18-nor-13ξ-androstanes of our invention have the general structural formula

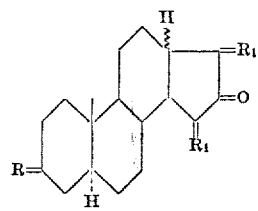

wherein R is selected from the group consisting of

and =O and Y is selected from the group consisting of hydrogen, lower alkanoyl and benzoyl and $R_1$ is selected from the group consisting of

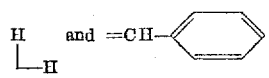

These compounds exhibit interesting pharmacological properties and are effective as a hypotensor. They may be used as intermediates in the preparation of other physiologically active derivatives by using customary reactions in the steroid series. The 3,16-diketo-18-nor-13ξ-androstane can be converted into aldosterone according to the following schematic outline using reactions known in the steroid art.

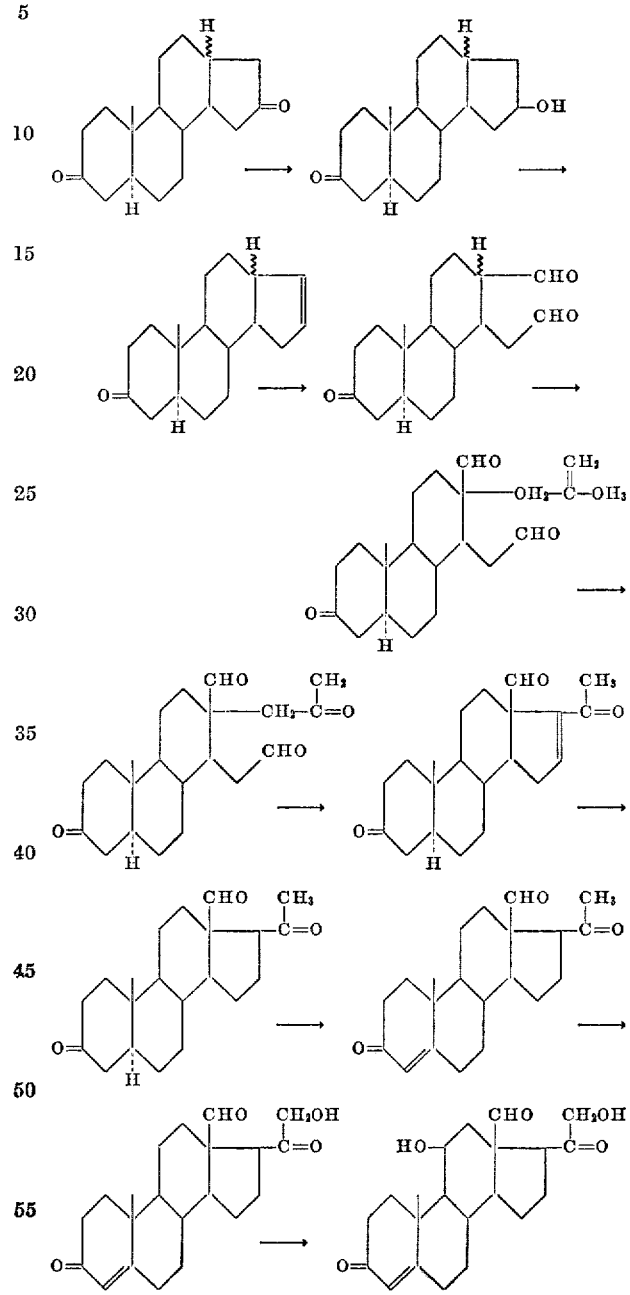

We have found that these heretofore undisclosed derivatives of 16-keto-18-nor-13ξ-androstanes substituted in the 3-position are obtained from 3β-hydroxy-18-nor-D-homo-13ξ-androstane-17-one of the Formula I, which is described in the literature. The flow diagram (Table I) illustrates the process schematically. The process starts by transforming this compound of the Formula I either into 3 - keto - 16,17 - seco - 18 - nor - D - homo - 13ξ - androstane-16,17-dioic acid of the Formula VII by the succession of operations described below, to arrive at the compounds of the Formula IXa, after transformation into diesters of the Formula VIII (R'=lower alkyl) and cyclization with a tertiary potassium or sodium alcoholate, or by transforming Compound I into the hydroxylated analog of Compound VIII, that is, 3β-hydroxy-16,17-seco-18-nor-D-homo-13ξ-androstane-16,17-dioic acid of the Formula V, which, after esterification and cyclization effected under the same conditions as for Compound VII, leads to derivatives of the Formula IXb. However, and without departing from the scope of the present invention, Compound VI may be transformed into Compound VII by oxidation, as can the corresponding esters, or Compound VII can be reduced to Compound VI, as can the corresponding esters. Similarly, the end Compounds IX, if they are hydroxylated in the 3-position, may be transformed into the corresponding ketones by oxidation.

TABLE I

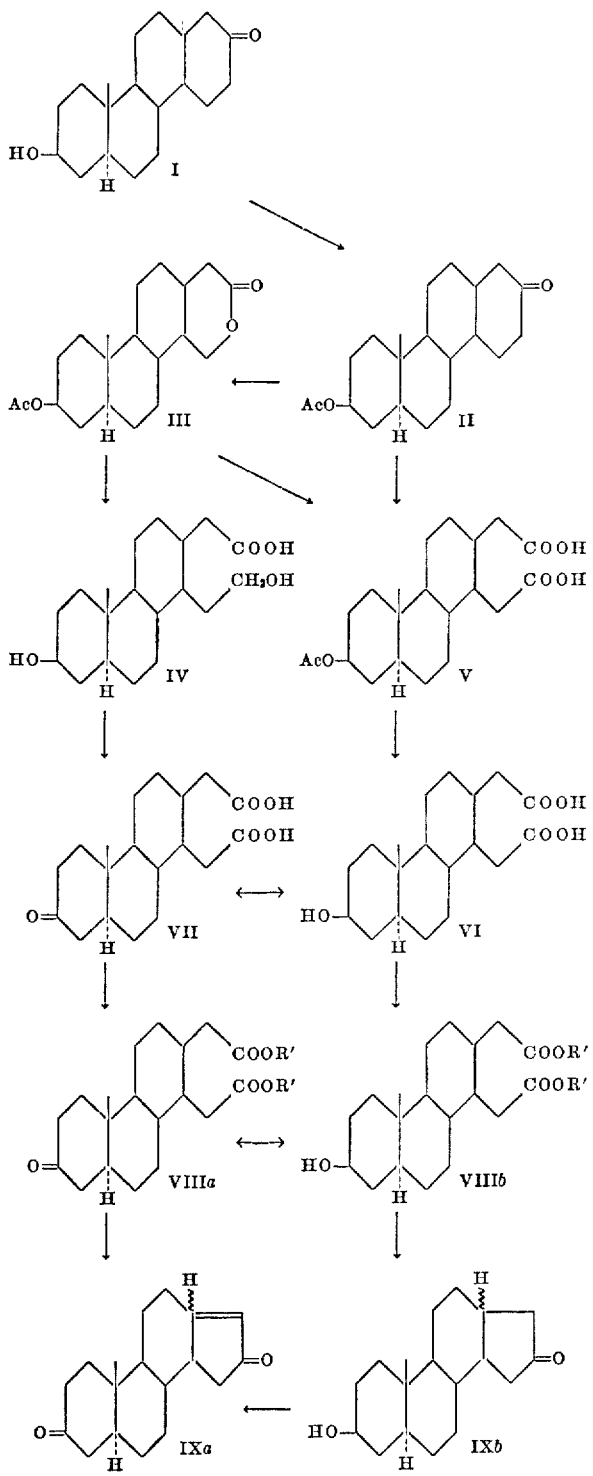

In accordance with the present invention and in conformance with the schematic representation above, the 3β - hydroxy - 18 - nor - D - homo - 13ξ - androstane - 17-one of the Formula I is transformed into 3β - acyloxy - 18-nor - D - homo - 13ξ - androstane - 17 - one of the Formula II by acylation procedures customary in steroid chemistry, that is, by reaction with an acid anhydride or acid chloride in the presence of a tertiary base. While any acylating agent may be used, we prefer to use anhydrides and acid chlorides of benzoic acid and the lower alkanoic acids such as acetic acid anhydride. Pyridine is the preferred tertiary base although other liquid tertiary organic bases in which the reactants are soluble can be used. This intermediate compound, in order to be transformed into the dioic Compound VII, is subjected first to an oxidation reaction with an organic percarboxylic acid, such as perbenzoic acid or perphthalic acid, in an inert solvent. It thus forms the lactone of 3β - acyloxy - 16 - hydroxy - 16, 17 - seco - 18 - nor - D - homo - 13ξ - androstane - 17 - oic acid of the Formula III. By treating this lactone (III) with an alkali metal hydroxide in an alcoholic medium, such as the lower alkanols, methanol or ethanol, 3β, 16-dihydroxy - 16,17 - 17 - seco - 18 - nor - D - homo - 13ξ-androstane - 17 - oic acid of the Formula IV is obtained through cleavage of the lactone function and simultaneous saponification of the ester radical in the 3-position. Chromic oxidation of this acid-alcohol (IV) directly yields the desired 3 - keto - 16,17 - seco - 18 - nor-D-homo-13ξ-androstane - 16,17 - dioic acid of the Formula VII.

The intermediate keto-dioic acid (VII) may also be obtained by first subjecting 3β - acyloxy - 18 - nor - D - homo-13ξ - androstane - 17 - one (II) to chromic oxidation with chromic-acetic acid at elevated temperatures. Opening of the D-ring takes place with formation of 3β - acyloxy - 16, 17 - seco - 18 - nor - D - homo - 13ξ - androstane - 16,17-dioic acid (V), the saponification of which by means of ethanolic or methanolic sodium hydroxide or potassium hydroxide leads to 3β - hydroxy - 16,17 - seco - 18 - nor-D - homo - 13ξ - androstane - 16,17 - dioic acid (VI). The acetoxylated diacid (V) may also be obtained starting with the lactone of the Formula III by oxidation with chromic anhydride in acetone solution in the presence of sulfuric acid. As mentioned above, the oxidation of Compound VI with chromic-acetic acid or N-bromo succinimide, N-bromo acetamide or bromo-hydantoin yields Compound VII. The esterification of the two acid radicals in Compound VI and VII with a lower alkanol containing sulfuric or hydrochloric acid, a di-lower-alkyl sulfate or diazomethane leads to diesters VIIIa and VIIIb. These diesters are cyclized with a tertiary alkanolate of an alkali metal, such as the tert-butylate or tert-amylate of potassium or sodium, in the presence of an inert solvent, such as benzene or toluene and after hydrolysis of the ester radical and subsequent decarboxylation, the Compounds IX (R=O, starting with Compound VIIIa and

starting with VIIIb) which are the subject matter of the subject matter of the present invention are obtained. The esters of the Formula VIIIb may also be prepared directly starting with Compound V by esterification with methanol in the presence of sulfuric acid or hydrochloric acid, the hydroxyl radical in the 3-position being liberated in this case by alcoholysis.

The following examples illustrate the present invention without limiting it.

EXAMPLE 1

Preparation of 3,16-diketo-18-nor-13ξ-androstane, (IXa)

(a) PREPARATION OF 3β-ACETOXY-18-NOR-D-HOMO-13ξ-ANDROSTANE-17-ONE (II)

2.1 gm. of 3β - hydroxy - 18 - nor - D - homo - 13ξ-androstane - 17 - one (I) (prepared in accordance with Miescher and Kagi, "Helvetica Chimica Acta," 1949, vol.

32, page 761, by catalytic hydrogenation with palladium black of 3β - hydroxy - 17 - keto - 18 - nor - Δ13(17a)-D - homo - androstene) having the following physical constants: melting point=174° C., $[\alpha]_D^{20}=-20°$ (c.=2%, chloroform), were dissolved in 60 cc. of pyridine, 15 cc. of acetic anhydride were added to the solution and the mixture was allowed to stand overnight at room temperature. The following day the mixture was poured into an ice-water mixture, the precipitate was separated by filtration, washed, dried and recrystallized twice from 60% ethanol. 2.1 gm., that is, 87% of theory, of the desired Compound II were obtained having the following physical constants: melting point =174° C., $[\alpha]_D^{20}=-30°\pm2$ (c.=1%, chloroform). The product is soluble in acetone, alcohol, ether, benzene and chloroform, slightly soluble in aqueous alcohol and insoluble in water.

Analysis.—$C_{21}H_{32}O_3=332.47$. Calculated: C, percent, 75.86; H, percent, 9.70; O, percent, 14.44. Found: C, percent, 75.8; H, percent, 9.7; O, percent, 14.8.

This compound is not described in the literature.

(b) PREPARATION OF THE LACTONE OF 3β-ACETOXY-16-HYDROXY-16,17-SECO-18-NOR-D-HOMO-13ξ - ANDROSTANE-17-OIC ACID, (III)

6.4 gm. of Compound II, obtained in accordance with (a) above, were dissolved in a mixture of 50 cc. of ether and 30 cc. of a 40% ethereal solution of perphthalic acid. After standing overnight, the solution was poured into a saturated aqueous solution of sodium bicarbonate in order to neutralize the phthalic acid, and the neutralized solution was extracted with a mixture of ether and benzene (70:30). The organic extract solutions were combined and washed with an aqueous solution of bicarbonate and then with water until neutral, dried over magnesium sulfate, filtered and evaporated to dryness. The residue was redissolved in ether. The lactone of the Formula III crystallized out. The crystalline product was filtered off, washed with ice cold ether and recrystallized from absolute ethanol. 5.35 gm. of the lactone III, representing a yield of 80% of theory, were obtained. Its melting point was 209° C. and it was soluble in benzene and chloroform, soluble in 10 vol. of boiling ethanol and insoluble in water and ether. After recrystallization from ethanol it had a melting point of 210 to 212° C. $[\alpha]_D^{20}=-45°\pm2$ (c.=1%, chloroform).

Analysis.—$C_{21}H_{32}O_4=348.47$. Calculated: C, percent, 72.38; H, percent, 9.26; O, percent, 18.37. Found: C, percent, 72.3; H, percent, 9.2; O, percent, 18.4.

This compound is not described in the literature.

(c) PREPARATION OF 3β-16-DIHYDROXY-16,17-SECO-18-NOR-D-HOMO-13ξ-ANDROSTANE-17-OIC ACID, IV 5.5 gm. of the lactone obtained in accordance with (b) above in a mixture of 60 cc. of methanol, 50 cc. of a 20% solution of potassium hydroxide in methanol and 30 cc. of water were heated for two hours under reflux in an atmosphere of nitrogen. The mixture was diluted by adding 100 cc. of water and then concentrated in a vacuum until the total volume was about 100 cc. The potassium salt of Compound IV partially crystallized out. Water was then added until the precipitate virtually completely dissolved. A slight amount of insoluble material remained behind which was eliminated by extraction with ether, the ether extract was washed with water and the wash waters were combined with the alkaline phase containing the potassium salt of Compound IV. The dissolved ether was driven off this solution and it was cooled to 0° C. The cooled solution was then acidified to a pH of 1 by adding concentrated hydrochloric acid. A white gelatinous precipitate of acid IV formed and was filtered off, washed with water and then dried. It was subsequently triturated with ether and crystallization rapidly took place. The mixture was filtered and washed with ether, yielding 4.05 gm. of Compound IV, representing a yield of 79% of theory. After recrystallization from an alcohol-ether mixture, its melting point was 166° C. The product was soluble in alcohol, poorly soluble in benzene, very poorly soluble in water and insoluble in ether.

Analysis.—$C_{19}H_{32}O_4=324.45$. Calculated: C, percent, 70.33; H, percent, 9.94; O, percent, 19.73. Found: C, percent, 70.1; H, percent, 10.0; O, percent, 19.5.

This compound is not described in the literature.

The diol acid IV may readily be identified in the form of the 3.16-dibenzoylated derivative of its methyl ester. For this purpose, 100 mgm. of Compound IV are refluxed for two hours in 5 cc. of methanol in the presence of 20 mgm. of p-toluene sulfonic acid. Thereafter, 20 cc. of water are added and the methanol is driven off under vacuum. An oil separates and is extracted with ether. The ether phase is washed with water until neutral, dried over magnesium sulfate, filtered and evaporated to dryness. The methyl ester of the diol is obtained in the form of a colorless oil which is soluble in the usual organic solvents, except petroleum ether. This oil (100 mgm.) is benzoylated by letting it stand at room temperature for one night with 2 cc. pyridine and 1 cc. benzoyl chloride. After the usual treatment, the dibenzoate of the methyl ester of Compound IV is recrystallized from alcohol and then from a mixture of ether and petroleum ether (30:70). It is obtained in the form of colorless needles having a melting point of 126° C. It is soluble in ether, acetone, benzene and chlorofrom, but insoluble in alcohol and water.

Analysis.—$C_{34}H_{42}O_6=546.68$. Calculated: C, percent, 74.69; H, percent, 7.74; O, percent, 17.56. Found: C. percent, 74.9; H, percent, 7.7; O, percent, 17.9.

This compound is not described in the literature.

(d) PREPARATION OF 3-KETO-16,17-SECO-18-NOR-D-HOMO-13ξ-ANDROSTANE-16,17-DIOIC ACID, VII

A solution of 2.1 gm. of Compound IV, obtained in accordance with (c) above, in 30 cc. of glacial acetic acid was added to a solution of 2 gm. of chromic anhydride in a mixture of 20 cc. of water and 20 cc. of acetic acid, and the combined solutions were allowed to stand overnight.

Thereafter, the solution was poured into water and extracted with ether. The ether extracts were washed with water and then with 1 N sodium hydroxide. The combined aqueous phases were acidified with 5 N hydrochloric acid to a pH of 1 in order to liberate the acid VII which was then extracted with ether. The ether extracts thus obtained were combined, washed with water until neutral, dried over magnesium sulfate, filtered and then evaporated to dryness. The oily residue (1.5 gm.) was taken up in ether and the keto diacid of the Formula VII crystallized. The mixture was iced, filtered and washed with ice cold ether. 1.15 gm. of the raw product, representing a yield of 52% of theory was recovered which was sufficient for the subsequent operations. For analysis, the raw product was recrystallized from aqueous methanol, whereupon it had a melting point of 261 to 262° C. This compound was very soluble in alcohol, very poorly soluble in water and insoluble in ether.

Anlysis.—$C_{19}H_{28}O_5=336.41$. Calculated: C, percent, 67.83; H, percent, 8.39; O, percent, 23.78. Found: C, percent, 67.6; H, percent, 8.4; O, percent, 24.2.

This compound is not described in the literature.

(e) PREPARATION OF THE DIMETHYL ESTER OF THE 3-KETO - 16,17 - SECO - 18 - NOR - D - HOMO-13ξ-ANDROSTANE-16,17-DIOIC ACID, VIIIa (R'=CH₃)

0.34 gm. of the keto-diacid VII obtained in accordance with (d) above was refluxed for 1 hour with a mixture of 5 cc. of methanol and 1 cc. of methanol containing 5% by volume of concentrated sulfuric acid. The solution was allowed to cool, water was added and the ester which immediately crystallized out was filtered off. After washing the filter cake with water it was redissolved in hot aqueous methanol, the small amount of insoluble material was filtered and the ester was allowed to crystallize out; the operation was repeated if necessary. The desired ester VIIIa (R'=CH₃) was obtained in the form of brilliant platelets having a melting point of 135° C. with a yield of 71% of theory. It was soluble in benzene and chloroform, moderately soluble in alcohol and insoluble in water.

*Analysis.*—$C_{21}H_{32}O_5 = 364.47$. Calculated: C, percent, 69.20; H, percent, 8.85; O, percent, 21.95. Found: C, percent, 69.5; H, percent, 8.9; O, percent, 21.5.

This compound is not described in the literature.

(*f*) CYCLIZATION OF ESTER VIII*a* (R′=CH₃) AND FORMATION OF 18-NOR-13ξ-ANDROSTANE-3,16-DIONE, IX*a*

Potassium tert-butylate, containing 0.5 gm. of potassium, was suspended in 50 cc. of boiling anhydrous benzene. While continuing to reflux, 0.1 gm. of ester VIII*a* (R′=CH₃) were added thereto under a stream of nitrogen and the mixture was refluxed in an atmosphere of nitrogen for an additional four hours. It was allowed to stand overnight at room temperature, and then acidified to a pH of 1 by adding 1 N sulfuric acid. Then benzene layer was washed with water until neutral, dried over magnesium sulfate, filtered and evaporated to dryness under a vacuum. The pale yellow oily residue was refluxed for 1 hour in a mixture of 10 cc. of acetic acid and 5 cc. of 10 N hydrochloric acid, then evaporated to dryness under a vacuum, and the residue was extracted with ether. The ethereal solution was washed with water, dried over magnesium sulfate and concentrated by evaporation to a volume of about 2 cc. The diketone IX*a* crystallized out in the form of massive triangular prisms. The solution was iced, filtered, the filter cake was washed with ice cold ether and dried. The crystals had a melting point of 170° C. The infra-red spectrum showed the presence of 2 carbonyl bands, one at 1705 cm.⁻¹ and the other at 1735 cm.⁻¹. The diketone was soluble in acetone, benzene and chloroform, slightly soluble in ether and insoluble in water.

*Analysis.*—$C_{18}H_{26}O_2 = 274.39$, ⅙ $H_2O$. Calculated: C, percent, 77.94; H, percent, 9.57; O, percent, 12.49. Found: C, percent, 77.9; H, percent, 9.5; O, percent, 13.2.

EXAMPLE 2

*Preparation of 3β-Hydroxy-16-Keto-18-Nor-13ξ-Androstane, IXb*

(*a*) PREPARATION OF 3β-ACETOXY-16,17-SECO-18-NOR-D-HOMO-13ξ-ANDROSTANE-16,17-DIOIC ACID (V), STARTING WITH COMPOUND II 1 gm. of 3β-acetoxy-18-nor-D-homo-androstane-17-one (II), obtained in accordance with Example 1(*a*), was dissolved in 20 cc. of acetic acid. 1 gm. of chromic anhydride dissolved in 2 cc. of water and 15 cc. of acetic acid was added over a period of 30 minutes to the solution, accompanied by agitation at 50° C. The resulting mixture was maintained for about an additional half hour at 50 to 55° C. Thereafter, the reaction mixture was poured into water, extracted with ether, the ether extract was washed with an aqueous saturated solution of sodium bicarbonate and then with water. The aqueous extracts and the bicarbonate solutions were combined, acidified with hydrochloric acid to a pH of 1 and extracted with ether. The ether extract was dried over magnesium sulfate, filtered and evaporated to dryness. The acid fraction weighing 0.7 gm. (consisting of Compound V), was recrystallized from ether. After recrystallization from this solvent, the acid V had a melting point of 231 to 232° C. The product was soluble in chloroform, alcohol and the alkalies, slightly soluble in ether, and insoluble in water; $[\alpha]_D^{20} = -33° \pm 2$ (c.=1% chloroform).

*Analysis.*—$C_{21}H_{32}O_6 = 380.47$. Calculated: C, percent, 66.30; H, percent, 8.48; O, percent, 25.23. Found: C, percent, 66.5; H, percent, 8.7; O, percent, 24.8.

This compound is not described in the literature.

(*b*) PREPARATION OF 3β-ACETOXY-16,17-SECO-18-NOR-D-HOMO-13ξ-ANDROSTANE-16,17-DIOIC ACID V, STARTING WITH COMPOUND III 9.65 gm. of the lactone having the Formula III, the preparation of which has been described in Example 1(*b*), were suspended in 120 cc. of acetone. The temperature was maintained below 10° C. and 20 cc. of an oxidizing solution, prepared from 10.3 gm. of chromic anhydride, 30 cc. of water and 8.7 cc. of concentrated sulfuric acid, were added to the acetone suspension over a period of 30 minutes.

The lactone dissolved rapidly and an abundant green precipitate formed. The solution was allowed to stand for three hours at 10° C. and then overnight at room temperature. A colorless solution and an abundant green precipitate were obtained. The reaction mixture was poured into water. The green precipitate dissolved and a colorless oil separated out which was extracted with ether. The combined ether extracts were washed with water until neutral, dried over magnesium sulfate, filtered and evaporated to dryness. 10.2 gm. of a pale yellow oil were obtained. This oil was entirely soluble in an aqueous solution of sodium bicarbonate. This oil was taken up in a mixture of ether and isopropyl ether (1:2). After icing this solution, the diacid (V) crystallized out. The crystals were separated and washed with ice cold ether. 3.56 gm. of the diacid V having a melting point of 234° C. were obtained. Recrystallization from methanol did not raise the melting point. $[\alpha]_D^{20} = -33° \pm 2$ (c.=1%, chloroform). The product was found to be identical in all respects with that obtained according to 2(*a*), and when the two products were admixed, no depression of the melting point was observed.

(*c*) PREPARATION OF 3β-HYDROXY-16,17-SECO-18-NOR-D-HOMO-13ξ-ANDROSTANE-16,17-DIOIC ACID (VI)

0.25 gm. of the acetoxylated di-acid V was refluxed for 1 hour in solution in 5 cc. of methanol and 5 cc. of 20% solution of potassium hydroxide in methanol. The solution was allowed to cool, 20 cc. water were added, the pH was adjusted to 1 by addition of 1 N sulfuric acid and the methanol was distilled off under a vacuum. The 3β-hydroxy-diacid precipitated out. The reaction mixture was iced, filtered and the filter cake was washed with water. 0.2 gm. of Compound VI having a melting point of 220° C. were obtained. This compound is not described in the literature.

By oxidation of the alcohol radical of Compound VI to a ketone radical the keto-diacid VII, previously described, is so obtained. For this purpose Compound VI was dissolved in 5 cc. of glacial acetic acid, a solution of 0.3 gm. of chromic anhydride in 5 cc. of water was added, the mixture was allowed to stand overnight in the refrigerator, water was added and the mixture was extracted with ether. The combined ether extracts were washed with water until neutral, dried over magnesium sulfate, filtered and evaporated to dryness. After recrystallization from aqueous methanol, the Compound VII precipitated out in the form of fine needles having a melting point of 262° C. A mixture of these needles and the product described in Example 1(*d*) did not depress the melting point.

(*d*) PREPARATION OF THE DIMETHYL ESTER OF 3β-HYDROXY-16,17-SECO-18-NOD-D-HOMO-13ξ-ANDROSTANE-16,17-DIOIC ACID, VIII*b* (R′=CH₃)

By heating the acid V, obtained according to 2(*b*) above, with methanol containing sulfuric acid, the two acid radicals were esterified and at the same time the hydroxyl radical in the 3-position was liberated by methanolysis.

4.05 gm. of the Compound V were refluxed for 2 hours with 50 cc. of methanol containing 2% sulfuric acid. The mixture was iced and water was slowly added. The hydroxy-di-ester, VIII*b*, crystallized out. The mixture was filtered, the filter cake was washed with water and recrystallized from aqueous methanol. 3.5 gm., representing a yield of 90% of theory, of the desired ester VIII*b* (R′=CH₃) having a melting point of 108 to 109° C., $[\alpha]_D^{20} = -35° \pm 2$ (c.=1%, chloroform) were obtained. The product was soluble in alcohol, ether, acetone, benzene and chloroform, insoluble in water and dilute acids and alkalies.

*Analysis.*—$C_{21}H_{34}O_5=366.48$. Calculated: C, percent, 68.82; H, percent, 9.35; O, percent, 21.83. Found: C, percent, 68.8; H, percent, 9.3; O, percent, 22.2.

This compound is not described in the literature.

(e) CYCLIZATION OF ESTER VIIIb (R'=CH₃) AND FORMATION OF 3β - HYDROXY-16-KETO - 18 - NOR-13ξ-ANDROSTANE, IXb

Sodium tert-butylate was prepared in an atmosphere of nitrogen, starting with 3 gm. sodium, by dissolving it in tertiary butyl alcohol under refluxing and evaporating the alcohol. It was taken up in 400 cc. of toluene. The solution was concentrated to about 100 cc. in order to drive off the tert-butanol remaining therein and the operation was repeated, if necessary, after addition of fresh toluene. The solution was brought to a volume of 200 cc. by addition or distillation of toluene, brought to reflux and 2.25 gm. of compound VIIIb (R'=CH₃), dissolved in 50 cc. of toluene, were added over a period of about 15 minutes. The refluxing was continued for an additional hour. The mixture was iced, acidified with sulfuric acid while agitating and extracted with toluene until the reddish-orange oil probably formed by the intermediate 3β-hydroxy-16-keto-18-nor-13ξ-androstane-17-methyl carboxylate was completely dissolved. The toluene extracts were combined, washed with water until the wash water was neutral, dried over magnesium sulfate, filtered, decolorized with vegetable charcoal, filtered and evaporated to dryness under vacuum. An orange oil was obtained which was dissolved in a mixture of 50 cc. of acetic acid; 25 cc. of concentrated hydrochloric acid and 5 cc. of water. In order to hydrolize the ester funtion and decarboxylate the compound, this solution was refluxed for one hour, then evaporated to dryness under vacuum. The residue was taken up in 50 cc. of methanol and 30 cc. of 1 N sodium hydroxide. The resulting solution was refluxed for 30 minutes, the methanol was driven off under vacuum, water was added and the oil which precipitated thereby was extracted with ether. The ether extract was washed with water until the wash water was neutral, dried over magnesium sulfate, filtered, decolorized with vegetable charcoal, filtered and evaporated to dryness. 1.5 gm. of a pale yellow oil were obtained. This oil was dissolved in a mixture of ether and isopropyl ether (1:5). Water was added to the solution until it began to turn turbid and it was allowed to stand overnight in the refrigerator. Thereafter, it was filtered and the filter cake was washed with isopropyl ether. 1.25 gm., representing a yield of 74% of theory, of 3β-hydroxy-16-keto-18-nor-13ξ-androstane IXb, were obtained. The product was solvated and melted first at 50° C. and then at 136° C. After recrystallization from aqueous methanol, the product was obtained in the form of large colorless needles having a melting point of 137° C. $[\alpha]_D^{20}=+75°\pm2$ (c.=1% chloroform). The product was soluble in alcohol, acetone, benzene and chloroform, slightly soluble in ether, and insoluble in water, alkalies and aqueous dilute acids.

*Analysis.*—$C_{18}H_{28}O_2=276.40$. Calculated: C, percent, 78.21; H, percent, 10.21; O, percent, 11.58. Found: C, percent, 78.00; H, percent, 10.1; O, percent, 11.5.

This product is not described in the literature. The same product was obtained by esterification with methanol in the presence of p-toluene sulfonic acid of the hydroxy diacid (VI) having a melting point of 220° C. and described in Example 2(c), followed by cyclization under the conditions indicated above.

By acetylation with acetic anhydride and pyridine at room temperature, precipitation of acetyl derivative with water and recrystallization from aqueous alcohol, 3β-acetoxy-16-keto-18-nor-13ξ-androstane having a melting point of 156° C. $[\alpha]_D^{20}=+54°\pm2$ (c.=1%, chloroform), and having substantially the same solubility characteristics as the nonacetylated derivative was obtained.

*Analysis.*—$C_{20}H_{30}O_3=318.44$. Calculated: C, percent, 75.43; H, percent, 9.50; O, percent, 15.07. Found: C, percent, 75.2; H, percent, 9.4; O, percent, 15.0.

This product is not described in the literature.

The proof of the structure of derivative IXb, that is the position of the ketone function in the 16-position, is accomplished by forming its dibenzylidene derivative by treatment with benzaldehyde in an alkaline medium. For this purpose, 0.11 gm. of Compound IXb were dissolved in 3 cc. of methanol. 1.5 cc. of caustic soda were added thereto in an atmosphere of nitrogen and then 0.5 cc. of benzaldehyde and the resulting mixture was allowed to stand for 4 hours at room temperature. The solution became turbid. Precipitation was primed by scratching and completed with water and the mixture was filtered, the filter cake was washed with water until neutral and recrystallized from methanol. 80 mgm. of the 15,17-dibenzylidene derivative having a melting point of 170° C. were obtained. The product was pale yellow but turned orange upon contact with the air.

Ultra-violet spectrum:
 $\lambda$ max.=232 m$\mu$; 238 m$\mu$
 $\epsilon$ (ethanol), 15,200; 27,700

The 16-benzylidene derivatives of the 17-keto-steroids show a maximum ultra-violet absorption of 295 m$\mu$ under the same conditions.

Finally, by chromic oxidation at room temperature Compound IXb was transformed into Compound IXa.

0.2 gm. of Compound IXb were treated for an hour and a half at room temperature with a solution of 0.15 gm. of chromic anhydride in 0.2 cc. of water and 0.3 cc. of acetic acid. After precipitation with water and recrystallization from aqueous alcohol, Compound IXa having a melting point of 170° C. was obtained. When mixed with the product obtained according to 1(f) the melting point was not depressed.

The above examples have been given for purposes of illustration and are non-limiting. It is evident, to one skilled in the art, that it is possible to make various changes and modifications without departing from the spirit of the invention. Thus, the temperatures and the solvents may be varied, other acyloxy derivatives, such as the benzoates, propionates or butyrates, of Compound I may be used in place of the 3-acetoxy derivative, and above all the choice of the reagents for oxidizing the alcohol radical in the 3-position to the ketone radical is in no way limited to chromic acid, but instead other oxidizing agents commonly used for this purpose in the steroid art may also be used.

Finally, instead of preparing the esters VIIIa and VIIIb by the processes indicated in the above examples, all other known processes for the preparation of such lower alkyl esters may also be employed.

While we have given specific examples of our invention, it is to be understood that various changes and modifications can be made. Such changes and modifications can be made without departing from the spirit of our invention and the scope of the following claims.

We claim:

1. The process of preparing 16-keto-18-nor-13ξ-androstanes substituted in the 3-position, having the general structural formula

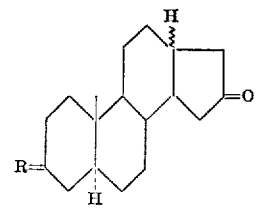

wherein R is selected from the group consisting of

and =O and Y is selected from the group consisting of hydrogen, lower alkanoyl and benzoyl, which comprises reacting 3β-hydroxy-18-nor-D-homo-13ξ-androstane-17-one with an acylating agent selected from the group consisting of lower alkanoic acid anhydrides, lower alkanoic acid chlorides, benzoic acid anhydrides and benzoic acid chlorides in the presence of sufficient liquid tertiary base to dissolve the reactants to form 3β-acyloxy-18-nor-D-homo-13ξ-androstane-17-one, subjecting said 3β-acyloxy-18-nor-D-homo-13ξ-androstane-17-one to an oxidation cleavage of the D ring selected from the group consisting of (1) the action of an organic percarboxylic acid in an inert solvent, the lactone of 3β-acyloxy-16-hydroxy-16,17-seco-18-nor-D-homo-13ξ-androstane-17-oic acid formed thereby is saponified by reaction with an alcoholic alkali metal hydroxide solution into 3β-16-di-hydroxy-16,17-seco-18-nor-D-homo-13ξ-androstane-17-oic acid, this compound is oxidized with chromic acid, (2) the action of chromic anhydride in hot acetic acid and (3) the action of an organic percarboxylic acid in an inert solvent to form the lactone of 3β-acyloxy-16-hydroxy-16,17-seco-18-nor-D-homo-13ξ-androstane-17-oic acid, said lactone is oxidized with chromic anhydride in the presence of sulfuric acid in acetone solution, to form a 16,17-seco-18-nor-D-homo-13ξ-androstane-16,17-dioic acid oxygenated in the 3-position, cyclizing the diester of this acid by the treatment with a tertiary alcoholate of an alkali metal in the presence of a benzene solvent, saponifying, decarboxylating and separating said 16-keto-18-nor-13ξ-androstanes.

2. 3β,16-dihydroxy-16,17-seco-18-nor-D-homo-13ξ-androstane-17-oic acid, having a melting point of 166° C.

3. 3-keto-16,17-seco-18-nor-D-homo-13ξ-androstane-16,17-dioic acid, having a melting point of 261 to 262° C.

4. The di-methyl ester of 3-keto-16,17-seco-18-nor-D-homo-13ξ-androstane-16,17-dioic acid, having a melting point of 135° C.

5. 3β-acetoxy-16,17-seco-18-nor-D-homo-13ξ-androstane-16,17-dioic acid, having a melting point of 231 to 234° C. and a specific rotation $[\alpha]_D^{20} = -33° \pm 2°$ (c.=1%, chloroform).

6. The di-methyl ester of 3β-hydroxy-16,17-seco-18-nor-D-homo-13ξ-androstane-16,17-dioic acid, having a melting point of 108 to 109° C. and a specific rotation $[\alpha]_D^{20} = -35° \pm 2°$ (c.=1%, chloroform).

References Cited in the file of this patent

UNITED STATES PATENTS

| | | |
|---|---|---|
| 2,324,881 | Ruzicka et al. | July 20, 1943 |
| 2,480,246 | Jacobsen et al. | Aug. 30, 1949 |
| 2,499,248 | Pincus et al. | Feb. 28, 1950 |
| 2,615,041 | Huffman | Oct. 21, 1952 |
| 2,621,210 | Miescher et al. | Dec. 9, 1952 |
| 2,648,700 | Jacobsen et al. | Aug. 11, 1953 |
| 2,699,447 | Huffman | Jan. 11, 1955 |
| 2,713,068 | Speziale | July 12, 1955 |
| 2,883,424 | Wildi | Apr. 21, 1959 |
| 2,963,493 | Huffman | Dec. 6, 1960 |

UNITED STATES PATENT OFFICE
CERTIFICATE OF CORRECTION

Patent No. 3,109,008                          October 29, 1963

Gaston Amiard et al.

It is hereby certified that error appears in the above numbered patent requiring correction and that the said Letters Patent should read as corrected below.

Column 2, lines 24 to 31, the upper right-hand portion of the formula should appear as shown below instead of as in the patent:

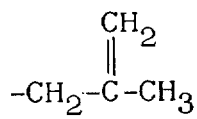

lines 33 to 41, the upper right-hand portion of the left-hand formula should appear as shown below instead of as in the patent:

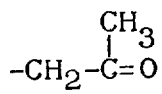

column 3, line 1, for "VIII" read -- VII --; line 3, for "V" read -- VI --; same column 3, formula IXa, the upper right-hand portion should appear as shown below instead of as in the patent:

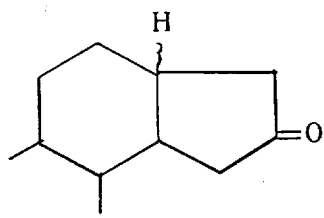

column 4, line 23, for "-16,17-17-" read -- -16,17- --; column 6, line 8, for "3.16-" read -- 3,16- --; column 8, line 45, strike out "so"; line 59, for "-NOD-" read ---NOR- --.

Signed and sealed this 3rd day of November 1964.

(SEAL)
Attest:

ERNEST W. SWIDER                          EDWARD J. BRENNER
Attesting Officer                      Commissioner of Patents